(12) United States Patent
Dudar (10) Patent No.: US 10,544,747 B2
(45) Date of Patent: Jan. 28, 2020

(54) SYSTEM AND METHOD FOR DIAGNOSING A TURBOCHARGER WASTEGATE OF AN ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 15/851,405

(22) Filed: Dec. 21, 2017

(65) Prior Publication Data
US 2019/0195158 A1 Jun. 27, 2019

(51) Int. Cl.
| | |
|---|---|
| F02D 41/22 | (2006.01) |
| F02B 77/08 | (2006.01) |
| F02B 37/18 | (2006.01) |
| F02D 41/26 | (2006.01) |
| F02N 11/04 | (2006.01) |

(52) U.S. Cl.
CPC .......... *F02D 41/221* (2013.01); *F02B 77/083* (2013.01); *F02B 37/183* (2013.01); *F02D 41/26* (2013.01); *F02N 11/04* (2013.01)

(58) Field of Classification Search
CPC ...... F02D 41/221; F02D 41/26; F02B 77/083; F02B 37/183; F02N 11/04

USPC ........................................................ 701/34.4
See application file for complete search history.

(56) References Cited

U.S. PATENT DOCUMENTS

| | | | |
|---|---|---|---|
| 2,474,203 A | * | 6/1949 | Sparrow ................... F02D 9/00 |
| | | | 137/48 |
| 7,251,989 B2 | | 8/2007 | Baeuerle |
| 10,094,304 B1 | * | 10/2018 | Dudar ................ F02N 11/0818 |
| 2013/0319093 A1 | | 12/2013 | Bleile et al. |
| 2016/0169092 A1 | * | 6/2016 | Ossareh .................. F02B 37/16 |
| | | | 701/108 |
| 2016/0194959 A1 | * | 7/2016 | Pekrul ................... F01C 1/3445 |
| | | | 418/1 |
| 2017/0226941 A1 | | 8/2017 | Ossareh et al. |

OTHER PUBLICATIONS

Dudar, A., "Systems and Methods for Wastegate Diagnostics," U.S. Appl. No. 15/873,626, filed Jan. 17, 2018, 52 pages.

* cited by examiner

*Primary Examiner* — Gertrude Arthur Jeanglaude
(74) *Attorney, Agent, or Firm* — Geoffrey Brumbaugh; McCoy Russell LLP (57) ABSTRACT

Systems and methods for diagnosing the presence or absence of turbocharger wastegate degradation are presented. In one example, an intake manifold pressure sensor provides a basis for determining whether or not turbocharger wastegate degradation present. The turbocharged engine may be rotated in a reverse direction to assess wastegate degradation.

20 Claims, 5 Drawing Sheets

SYSTEM AND METHOD FOR DIAGNOSING A TURBOCHARGER WASTEGATE OF AN ENGINE

BACKGROUND AND SUMMARY

An engine may include a turbocharger to increase air flow to the engine, thereby increasing power output by the engine. The turbocharger uses exhaust gas energy to turn a turbine and the turbine rotates a compressor via a shaft that connects the turbine to the compressor. Speed of the compressor influences air pressure in the engine's intake system. If compressor speed is higher than is desired, then pressure in the engine intake system may be higher than is desired. One way to limit compressor speed and engine intake system pressure is to install a wastegate with the turbocharger. The wastegate may allow a portion of exhaust gases to bypass the turbine to control turbine and compressor speed. The wastegate may be configured with a spring that holds the wastegate closed until pressure upstream of the compressor exceeds a threshold pressure, then the wastegate may open to limit or maintain compressor speed and engine intake pressure. However, it may be possible for the wastegate to be stuck in an open or closed state due to soot in the engine's exhaust system or degradation of the wastegate's components, such as the spring. If the wastegate is stuck in an open position, the engine may not be able to produce as much power as is desired. If the wastegate is stuck in a closed position, engine intake system pressure may be greater than is desired. Therefore, it may be desirable to provide a way of diagnosing a wastegate. However, if the wastegate is diagnosed while the engine is operating, engine performance may suffer or the vehicle may not perform in an expected way. Consequently, it may be desirable to provide a way of diagnosing a turbocharger wastegate without disturbing vehicle occupants or disturbing vehicle operation.

The inventor herein has developed an engine operating method, comprising: receiving sensor data to a controller and generating a wastegate diagnostic request via the controller; providing an indication of wastegate degradation based on intake manifold pressure, the intake manifold pressure sensed while rotating an engine in a reverse direction and not combusting air and fuel in the engine in response to the wastegate diagnostic request; and adjusting an actuator in response to the indication.

By rotating an engine in a reverse direction and measuring engine intake manifold pressure, it may be possible to provide the technical result of diagnosing turbocharger wastegate operation without disturbing vehicle occupants or compromising vehicle performance. In particular, the engine may be rotated in a reverse direction when the engine is not operating and a manifold absolute pressure (MAP) sensor may provide an indication of engine intake manifold pressure. The engine intake manifold pressure may indicate whether the wastegate is open or closed based on an amount of time it takes for engine intake manifold pressure to reach a threshold pressure after an intake throttle is closed from an open position. If it takes a longer than a threshold amount of time for engine intake pressure to reach the threshold pressure, the wastegate may be determined to be closed since closing the wastegate may restrict air flow from the exhaust system to the engine intake when the engine is rotated in a reverse direction. If it takes less than the threshold time for engine intake pressure to reach the threshold pressure, then it may be determined that the wastegate is in an open state since an open wastegate may be less restrictive to air passing through the exhaust system and into the engine intake when the engine is rotated in a reverse direction. In this way, it may be determined whether or not a wastegate is responding to opening and closing commands in an expected way.

The present description may provide several advantages. In particular, the approach may provide improved diagnostics of turbocharger wastegate operation. Additionally, the approach may assess wastegate operation with existing engine sensors so that diagnostics may not increase engine cost. Further, the approach may be accomplished while rotating the engine at lower speeds since air flow through the engine may be increased when the engine rotated in a reverse direction as compared to when the engine is rotated in a forward direction during similar conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
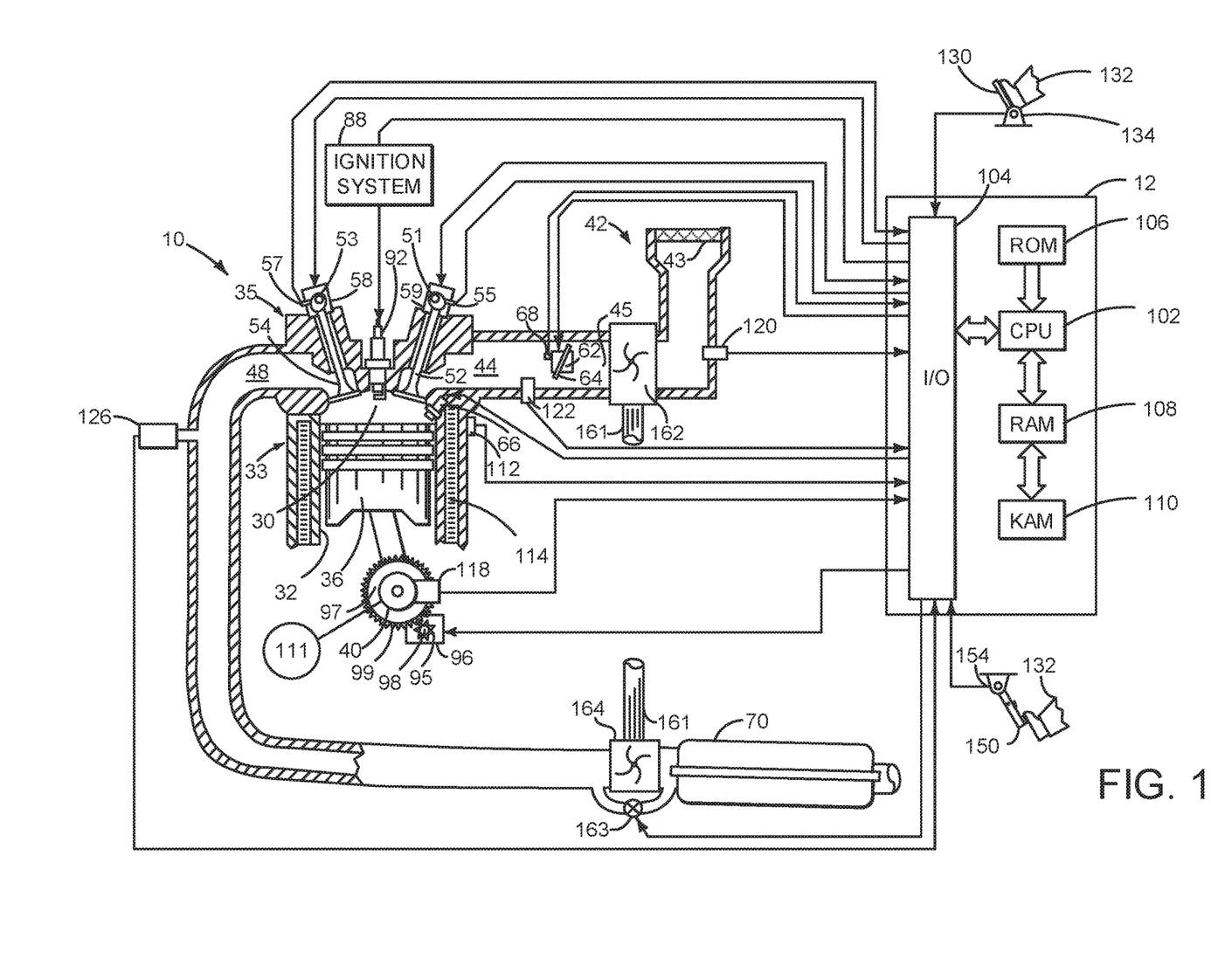
FIG. 1 shows a schematic diagram of one cylinder of an example engine system.
Figure 2:
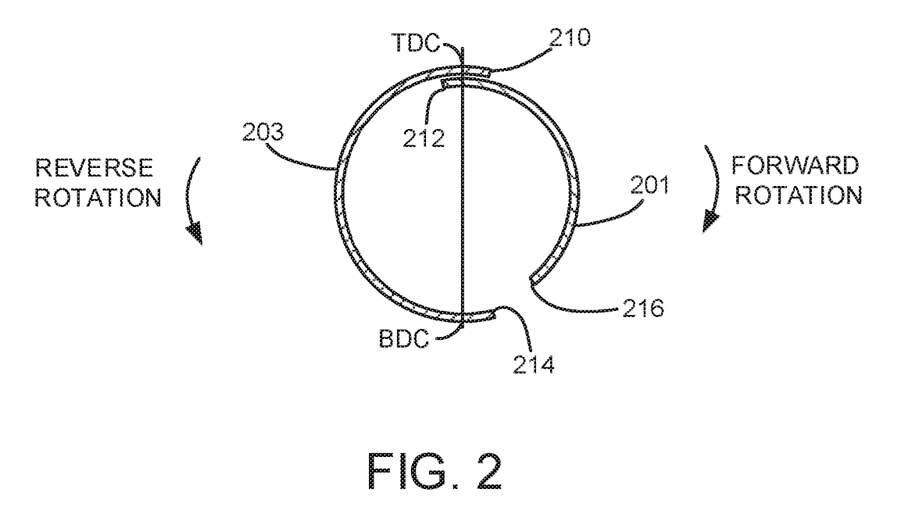
FIG. 2 shows an example cylinder valve activating/deactivating device.

The present description is related to diagnosing operation of a turbocharger wastegate of an internal combustion engine. The engine may include a turbocharger as shown in FIG. 1. The engine may also include valve timing where an exhaust valve opening duration is longer than an intake valve opening duration as is shown in FIG. 2. A wastegate diagnostic may be performed according to the sequence shown in FIG. 3. The wastegate diagnostic of FIG. 3 may be performed via the method shown in FIGS. 4 and 5 along with the engine system shown in FIGS. 1 and 2.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 may rotate in a forward direction (e.g., clockwise) or in a reverse direction (e.g., counter clockwise) via being supplied electrical power by an H bridge circuit (not shown). In other examples, integrated starter/generator (ISG) 111 may rotate engine in a forward or reverse direction and ISG 111 may be directly coupled to crankshaft 40 or coupled to crankshaft 40 via a belt.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Wastegate 163 may be adjusted via controller 12 to allow exhaust gases to selectively bypass turbine 164 to control the speed of compressor 162. Air filter 43 cleans air entering engine air intake 42. Throttle 62 is positioned downstream of compressor 162 in the direction of air flow into engine 10.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Engine torque actuators may include throttle 62, fuel injector 66, ignition system 88, wastegate 163, intake valve actuator 59, and exhaust valve actuator 58 since these actuators may be adjusted to increase or decrease engine torque. The engine torque actuators may be adjusted responsive to vehicle operating conditions including a position of accelerator pedal 130.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake poppet valve 52 and exhaust poppet valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows example valve timings that increase the benefit of rotating an engine in a reverse direction (e.g., counter clockwise) when diagnosing a turbocharger wastegate. Forward and reverse engine rotation directions are indicated by arrows. Exhaust valve open timing is represented by the outer ring 203. Intake valve open timing is represented by the inner ring 201. The valve timings are referenced to cylinder positions top-dead-center (TDC) and bottom-dead-center (BDC). The exhaust valve closing time (EVC) when the engine is rotated in a forward direction is at 210. The exhaust valve opening (EVO) time when the engine is rotated in a forward direction is at 214. The intake valve closing (IVC) time when the engine is rotated in a forward direction is at 216. The intake valve opening (IVO) time when the engine is rotated in a forward direction is at 212. If the engine is rotated in a reverse direction, EVO occurs at 210 and EVC occurs at 214. IVO occurs at 216 and IVC occurs at 212 when the engine is rotated in the reverse direction.

Thus, it may be observed that the exhaust valve opening duration is longer than the intake valve opening duration. Further, IVO is near TDC and IVC is well advanced of BDC for rotating the engine in a forward direction. EVO is near BDC and EVC is near TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. For these reasons, air flow through the engine when the engine is rotated with an open intake throttle and unfueled in a reverse direction may be greater than air flow through the engine when the engine is rotated with the intake throttle open and unfueled in a forward direction at a same engine speed. The increased air flow through the engine while the engine is rotated at a first speed in a reverse direction is due to the longer exhaust valve opening duration and exhaust valve opening and closing timings. The decreased air flow through the engine while the engine is rotated at the first speed in a forward direction is due to the shorter intake valve opening duration and intake valve opening and closing timings as compared to the exhaust valve opening duration and the exhaust valve opening and closing times. Thus, whether air flow through an engine while rotating the engine in a forward direction at a first speed is greater than air flow through the engine while rotating the engine in a reverse direction at the first speed depends on intake and exhaust valve timings, including valve opening durations and valve opening and closing times. Consequently, for some engine configurations, rotating an engine in a forward direction provides more air flow through the engine for a given engine speed as compared to rotating the same engine at the same given speed in a reverse direction. On the other hand, as shown, other engines that may provide more air flow through the engine at a given engine speed when rotated in a reverse direction as compared to rotating the same engine at the same speed in the forward direction. Thus, the engine may be rotated in a reverse direction to provide a desired air flow through the engine at a lower speed as compared to rotating the engine in a forward direction at a same speed. Therefore, engine rotation may be less noticeable and energy to rotate the engine to provide a desired air flow may be reduced.

Figure 3:
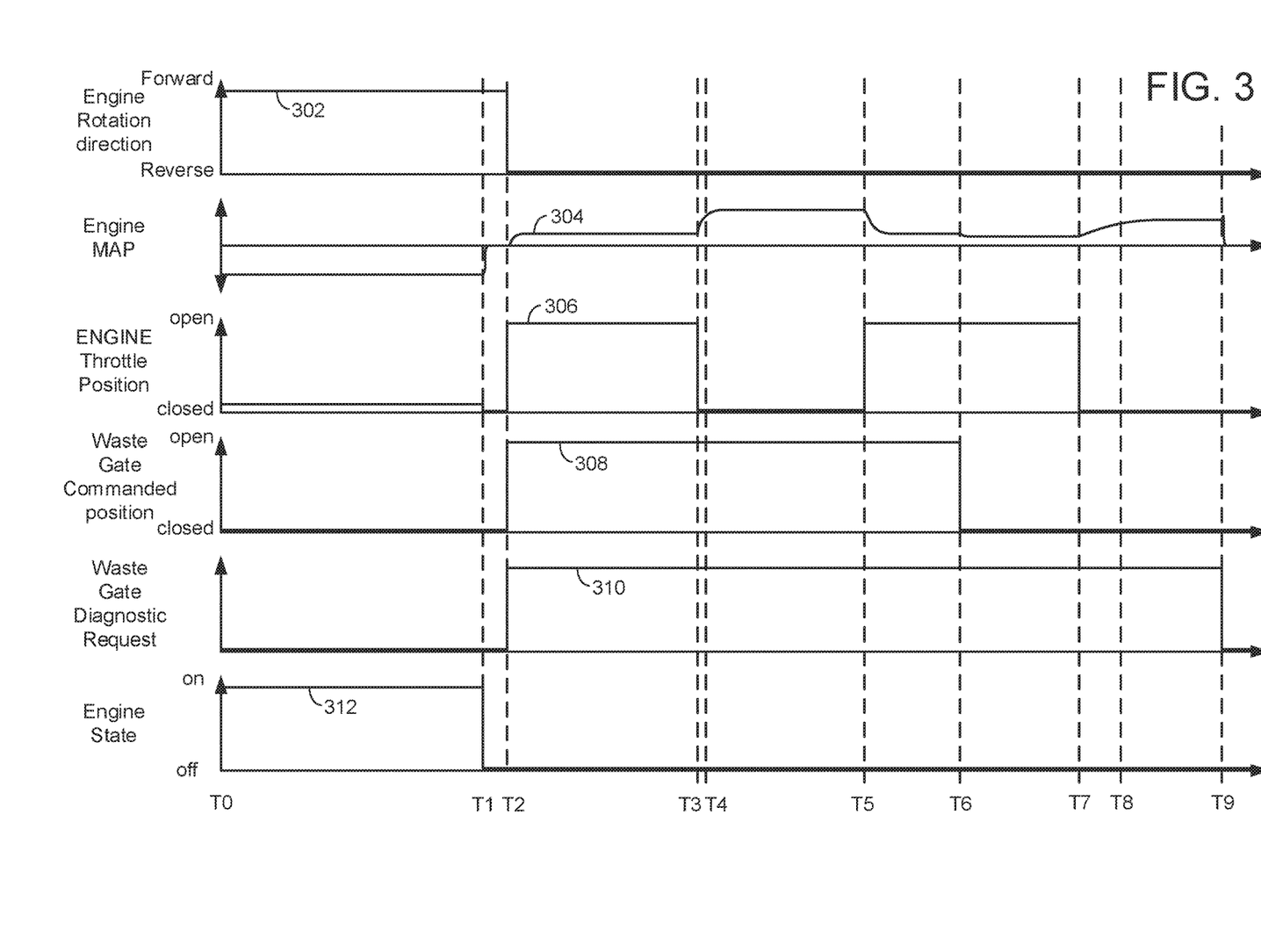
FIG. 3 shows an example engine operating sequence.

Referring now to FIG. 3, an example wastegate diagnostic sequence is shown. The operating sequence of FIG. 3 may be produced via the system of FIGS. 1 and 2 executing instructions of the method described in FIGS. 4 and 5. Each plot shown in FIG. 3 occurs at the same time as the other plots in FIG. 3, and vertical markers T0-T9 indicate times of particular interest during the sequence. In this example, air flow through the engine while the engine is rotated unfueled in a reverse direction is greater than air flow through the engine if the engine is rotated unfueled in a forward direction when the engine is rotated at a same speed in the forward and reverse directions.

The first plot from the top of FIG. 3 represents direction of engine rotation versus time. The vertical axis represents direction of engine rotation and engine rotation is in a forward direction when trace 302 is at a higher level near the vertical axis arrow. The engine rotates in a reverse direction when trace 302 is at a lower level near the horizontal axis. The horizontal axis represents time and time increases from the left side of the figure to the right side of the figure. Trace 302 represents the direction of engine rotation.

The second plot from the top of FIG. 3 represents engine intake manifold absolute pressure (MAP) versus time. The vertical axis represents engine MAP and engine MAP increases in the direction of the vertical axis arrow. The level of the horizontal axis represents atmospheric pressure. The horizontal axis represents time and time increases from the left hand side of the figure to the right hand side of the figure. Trace 304 represents engine MAP.

The third plot from the top of FIG. 3 represents engine intake throttle position versus time. The vertical axis represents engine intake throttle position and engine intake throttle position opens in the direction of the vertical axis arrow. The horizontal axis represents time and time increases from the left hand side of the figure to the right hand side of the figure. Trace 306 represents engine throttle position.

The fourth plot from the top of FIG. 3 represents turbocharger wastegate commanded position versus time. The vertical axis represents turbocharger wastegate commanded position and the wastegate is commanded open when trace 308 is at a higher level near the vertical axis arrow. The turbocharger wastegate is commanded to a closed position when trace 308 is at a lower level near the horizontal axis. The horizontal axis represents time and time increases from the left hand side of the figure to the right hand side of the figure. Trace 308 represents turbocharger wastegate commanded position.

The fifth plot from the top of FIG. 3 represents turbocharger wastegate diagnostic request state versus time. The vertical axis represents turbocharger wastegate diagnostic request state and a turbocharger wastegate diagnostic request is asserted when trace 310 is at a higher level near the vertical axis arrow. The turbocharger wastegate diagnostic is not requested when trace 310 is at a lower level near the horizontal axis. The horizontal axis represents time and time increases from the left hand side of the figure to the right hand side of the figure. Trace 310 represents the turbocharger wastegate diagnostic request state.

The sixth plot from the top of FIG. 3 represents engine state versus time. The vertical axis represents engine state and the engine is on (e.g., combusting air and fuel) when trace 312 is at a higher level near the vertical axis arrow. The engine is stopped (e.g., not combusting air and fuel) when trace 312 is at a lower level near the horizontal axis. The horizontal axis represents time and time increases from the left hand side of the figure to the right hand side of the figure.

At time T0, the engine is on and rotating in a forward direction. Engine MAP is at a lower level indicating vacuum within the engine intake manifold. The engine throttle is partially open and the turbocharger wastegate is commanded closed. The wastegate diagnostic is not requested.

At time T1, the engine is stopped in response to an operator instruction (not shown). The engine is stopped and engine MAP is at atmospheric pressure. The engine throttle is closed and the wastegate remains closed. The wastegate diagnostic is not requested.

At time T2, the wastegate diagnostic is requested responsive to vehicle operating conditions. The wastegate diagnostic may be requested a predetermined amount of time after the engine has stopped and vehicle occupants are expected to have left the vehicle. Further, the wastegate diagnostic may be requested in response to a distance that the vehicle has traveled or intake manifold pressure being higher or lower than is expected. The engine throttle is opened in response to the wastegate diagnostic request. In addition, the wastegate is commanded to an open position and the engine starts rotating in a reverse direction in response to the wastegate diagnostic being requested. The engine MAP increases slightly shortly after time T2 in response to air flowing into the engine intake from the engine exhaust system. The engine is begins to rotate in the reverse direction without being fueled via the starter or ISG. The engine continues to rotate in a reverse direction unfueled between time T2 and time T3. The time between T2 and T3 may be long or short, but it is sufficient to allow MAP to stabilize at a constant value that is a function of engine speed and valve timing.

At time T3, the engine throttle is commanded closed to assess the state of the wastegate and so that pressure may increase in the intake manifold due to air being pumped through the engine while the engine rotates in the reverse direction. The amount of time it takes for the pressure rise to the final stabilized pressure and the final stabilized intake manifold pressure may be indicative of the turbocharger wastegate state. For example, if the wastegate is open and following the wastegate command, the pressure in the engine intake manifold may rise quicker and it may achieve a higher pressure as compared to if the wastegate is closed. An open wastegate allows engine cylinders to more draw air from atmosphere through the exhaust system and past the turbocharger turbine into the engine cylinders. Consequently, the engine may pump more air if the wastegate is open. By pumping a larger amount of air into the engine intake manifold while the throttle is closed, the engine intake manifold pressurize may rise faster and it may reach a higher pressure as compared to if the wastegate is closed and limiting air flow from atmosphere to engine cylinders. The wastegate remains commanded to an open state and the engine continues to rotate in the reverse direction. The wastegate diagnostic remains asserted and the engine remains off.

At time T4, the engine MAP has increased to 63.2% of its final value. The amount of time from T3 to time T4 is the time constant for pressurizing the engine intake manifold after closing the engine throttle with the wastegate open. The engine continues to rotate in a reverse direction and the engine throttle remains closed. The wastegate is commanded open and the wastegate diagnostic is asserted. The engine remains off while it rotates. If the wastegate where closed when it was commanded open, then the time between T3 and T4 would increase so as to move T4 to the right (e.g., a time later in the future). Further, if the wastegate were closed when it was commanded open, the final engine intake pressure may be lower than if the wastegate were open in otherwise same conditions. Between time T4 and T5 the engine MAP stabilizes to a constant value and the engine continues to rotate in a reverse direction while the engine is not fueled. The engine throttle remains closed and the wastegate remains commanded open. A small amount of air may pass the engine throttle even though the engine throttle is commanded closed.

At time T5, the engine throttle is commanded open and engine MAP is reduced in response to the restriction of flow in the engine intake manifold being reduced. The engine continues to rotate in a reverse direction without fuel. The wastegate remains commanded open and the wastegate diagnostic request remains activated. The engine remains commanded off.

At time T6, the turbocharger wastegate is commanded closed to verify the wastegate follows the closed command. The engine MAP is reduced a small amount since air flow through the engine is reduced via closing the wastegate. The engine continues to rotate in the reverse direction unfueled and the engine throttle remains open. The wastegate diagnostic remains asserted and the engine remains off.

At time T7, the engine throttle is commanded closed to assess the state of the wastegate and so that pressure may increase in the intake manifold due to air being pumped through the engine while the engine rotates in the reverse direction. A lower amount of air may be pumped through the engine when the wastegate is commanded to the closed position as compared to if the wastegate is commanded open when the engine is rotated in the reverse direction. The amount of time it takes for the intake manifold pressure to rise to the final stabilized pressure may increase since the wastegate goes to the closed position and restricts air flow from atmosphere through the turbocharger and into the engine. The wastegate remains commanded to the closed state and the engine continues to rotate in the reverse direction. The wastegate diagnostic remains asserted and the engine remains off.

At time T8, the engine MAP has increased to 63.2% of its final value. The amount of time from T7 to time T8 is the time constant for pressurizing the engine intake manifold after closing the engine throttle with the wastegate closed. The engine continues to rotate in a reverse direction and the engine throttle remains closed. The wastegate is commanded open and the wastegate diagnostic is asserted. The engine remains off while it rotates. If the wastegate where open when it was commanded closed, then the time between T7 and T8 would decrease so as to move T8 to the left (e.g., an earlier time). Further, if the wastegate were open, then the final MAP value may be higher. Between time T7 and T8 the engine MAP stabilizes to a constant value and the engine continues to rotate in a reverse direction while the engine is not fueled. The engine throttle remains closed and the wastegate remains commanded open. A small amount of air may pass the engine throttle even though the engine throttle is commanded open.

At time T9, the wastegate diagnostic request is withdrawn and the engine stops rotating in the reverse direction. The engine remains deactivated and the engine throttle remains commanded closed. The engine MAP is reduced to atmospheric pressure and the wastegate remains commanded closed.

In this way, an engine may be rotated unfueled in a reverse rotation to diagnose a turbocharger wastegate. The wastegate may be commanded open and closed while the engine throttle is closed. The engine intake manifold pressure may be indicative of whether or not the wastegate has moved to its commanded position.

Figure 4:
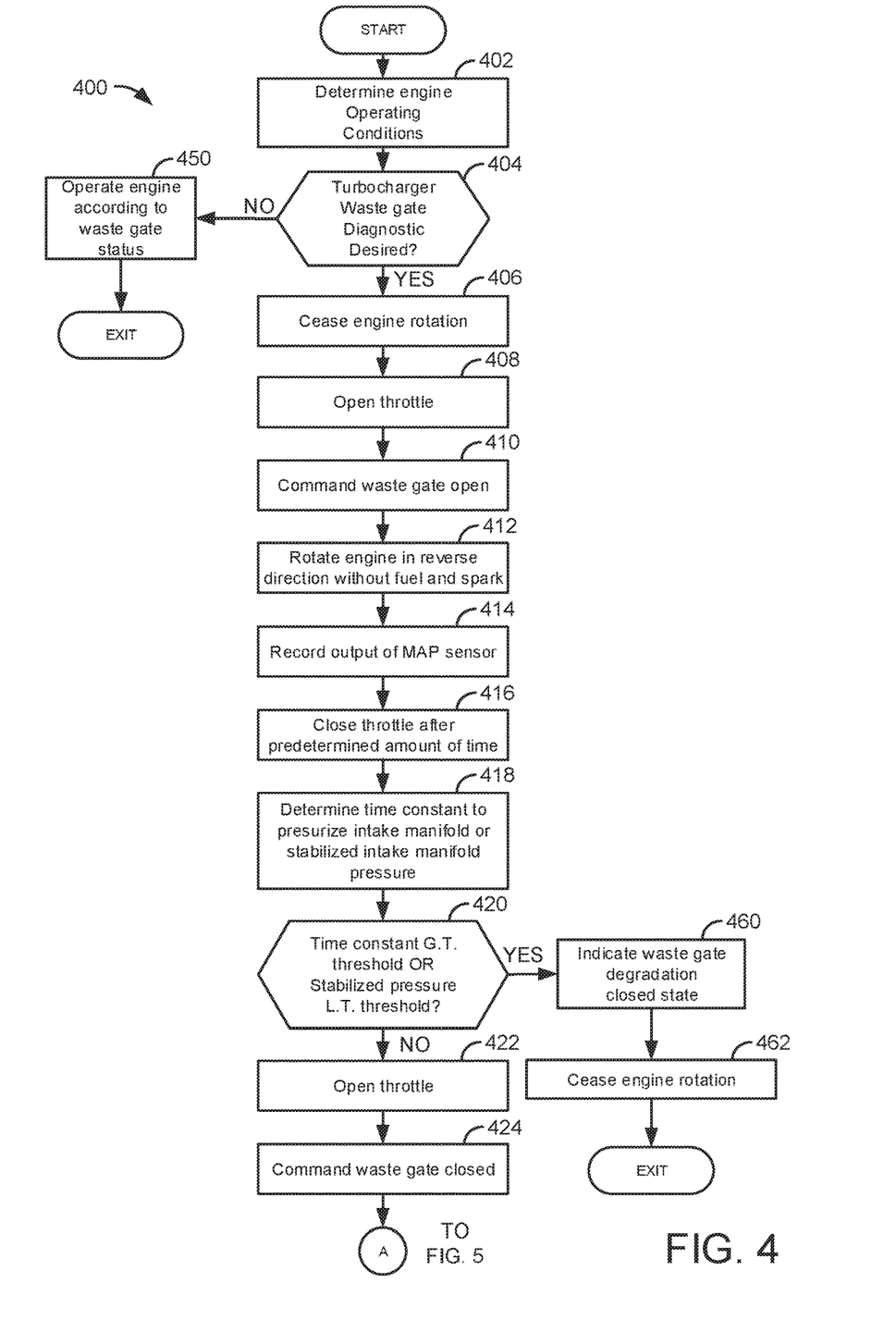
FIGS. 4 and 5 show an example method for operating an engine and diagnosing wastegate operation.
Figure 5:
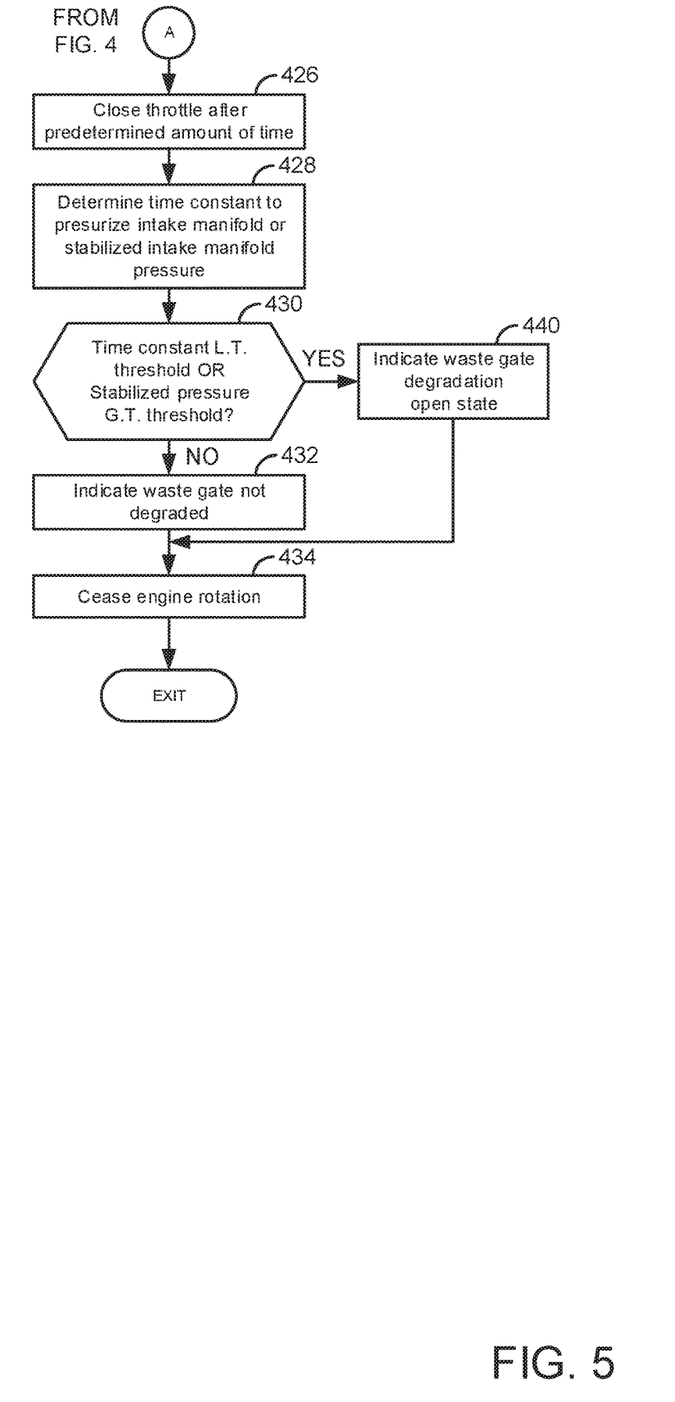

Referring now to FIGS. 4 and 5, a method for operating an engine and determining the presence or absence of turbocharger wastegate degradation is described. The method of FIGS. 4 and 5 may be incorporated into and may cooperate with the system of FIGS. 1 and 2. Further, at least portions of the method of FIGS. 4 and 5 may be incorporated as executable instructions stored in non-transitory memory while other portions of the method may be performed via a controller transforming operating states of devices and actuators in the physical world. The engine controller described herein also includes instructions to operate the engine at the conditions described herein.

At 402, method 400 determines engine operating conditions. Engine operating conditions may be determined from data received to the controller via sensors and actuators that are coupled to the controller. Engine operating conditions may include but are not limited to engine operating state, engine speed, engine load, engine temperature, vehicle speed, wastegate position, engine MAP, and direction of engine rotation. Method 400 proceeds to 404 after engine operating conditions are determined.

At 404, method 400 judges whether or not a turbocharger wastegate diagnostic is desired. In one example, turbocharger wastegate diagnostics may be desired after a vehicle travels a predetermined distance, after vehicle passengers have exited a vehicle, if a vehicle is being remotely started, or if the vehicle is a hybrid vehicle and driver demand is low enough to cease engine operation. If method 400 judges that turbocharger wastegate diagnostics are desired, the answer is yes and method 400 proceeds to 406. Otherwise, the answer is no and method 400 proceeds to 450.

At 450, method 400 operates the engine according to the latest status of the turbocharger wastegate. For example, if the turbocharger wastegate is determined to be degraded, then one or more actuators may be adjusted to operate the engine based on how the wastegate is degraded. If the wastegate is determined to be degraded in a closed state, then engine speed may be limited via limiting the throttle opening amount and limiting an amount of fuel that may be injected to the engine. Further, spark timing may be retarded from minimum spark timing for best torque (MBT) in response to the wastegate being degraded in a closed state. If the wastegate is determined to be degraded in an open state, method 400 may adjust engine actuators to improve engine emissions. In one example, the amount of intake and exhaust valve overlap may be increased since the engine may be able to tolerate a larger amount of internal exhaust gas recirculation (EGR) and since external EGR may be limited due to the wastegate being held open. Additionally, spark timing may be adjusted in response to the amount of internal EGR. Method 400 proceeds to exit.

At 406, method 400 ceases engine rotation and combustion in engine cylinders if the engine is combusting air and fuel. Method 400 may cease combustion in the engine and engine rotation via ceasing to supply fuel to the engine via stopping fuel flow through the fuel injectors. Method 400 proceeds to 408.

At 408, method 400 fully opens the engine intake throttle (e.g., 62 of FIG. 1). The engine throttle is opened to reduce air flow restriction through the engine. Method 400 proceeds to 410.

At 410, method 400 commands the wastegate to an open position. Controller 12 may command the wastegate to the open position via an electrical signal. The electrical signal may directly open the wastegate or it may open a valve to allow vacuum to assist opening of the wastegate. Method 400 proceeds to 412.

At 412, method 400 rotates the engine crankshaft in a reverse direction that is opposite to the direction the engine crankshaft rotates when the combustion occurs in engine cylinders. The engine is rotated without being supplied fuel and it is rotated via an electric machine (e.g., an integrated starter/generator or a low voltage starter). By rotating the engine in a reverse direction, air may flow from atmosphere, through the engine exhaust manifold, through engine cylinders from the engine exhaust manifold, into the engine intake manifold from engine cylinders, and then out to atmosphere. In other words, the direction of air flow through the engine is reversed from a normal air flow path through the engine when the engine is rotated in reverse. Further, by rotating the engine in the reverse direction, air flow through the engine may be increased for a given engine speed because of longer exhaust valve opening times as compared to intake valve opening times. Therefore, the engine may be rotated at a lower speed to achieve a desired air flow rate through the engine.

Method 400 also selects a speed to rotate the engine in reverse. Method 400 may rotate the engine at a first higher speed in the reverse direction when battery state of charge is greater than a first threshold and when battery useful life is greater than a second threshold. Method 400 may rotate the engine at a second speed in the reverse direction when battery state of charge is less than the first threshold or when battery useful life is less than the second threshold, the second speed lower than the first speed. By rotating the engine at the second speed, it may be possible to stress the battery less to increase battery life. On the other hand, the time to perform the diagnostic may be reduced via rotating the engine at the first speed since the engine may pump more air when it rotates at the first speed, thereby reducing the amount of time for intake manifold pressure to evolve. In still another example, method 400 may rotate the engine at a third higher speed in the reverse direction when engine temperature is greater than a third threshold. Method 400 may rotate the engine at a fourth speed in the reverse direction when engine temperature is less than the third threshold, the fourth speed lower than the third speed. By rotating the engine at the fourth speed, it may be possible to drain the battery less so that the diagnostic may still be performed at low temperatures. Method 400 proceeds to 414 after beginning to rotate the engine in a reverse direction without supplying fuel to the engine.

At 414, method 400 records or stores to controller random access memory engine MAP values while rotating the engine in a reverse direction. The engine MAP values may reflect the amount of air flowing through the engine from the exhaust manifold to the intake manifold. Method 400 proceeds to 416.

At 416, method 400 closes the engine intake throttle (e.g., 62 of FIG. 1) in a step wise manner. The throttle is closed so that air flow out of the engine intake manifold to atmosphere via the engine intake may be limited or reduced. By closing the throttle, pressure in the intake manifold may increase due to air flowing out of engine cylinders and into the engine intake manifold as the engine rotates in the reverse direction. Method 400 proceeds to 418.

At 418, method 400 determines a time constant for a pressure change in the engine intake manifold. In particular, method 400 determines a time constant for increasing pressure in the engine intake manifold from an initial pressure when the throttle was open with the engine rotating in the reverse direction to a final pressure in the engine intake manifold when the throttle is closed with the engine rotating in the reverse direction. The time constant may be determined after the engine intake throttle has been closed for a predetermined amount of time that allows the engine intake manifold pressure to stabilize at a substantially constant value (e.g., ±5% of reading). In one example, the predetermined amount of time may be determined via monitoring engine intake manifold pressure while the engine is rotated in the reverse direction with the wastegate open and the throttle open, then closing the throttle.

The time constant is determined via processing the engine MAP data beginning just before the engine throttle is closed until engine MAP reaches a stabilized substantially constant value. The time constant for the manifold pressure change is the amount of time from when the throttle is commanded closed until the engine MAP value reaches 63.2% of the stabilized substantially constant value after the throttle was closed. The value of the time constant may also be indicative of the wastegate position since the wastegate position may restrict or allow air to flow around the turbocharger compressor, thereby regulating air flow into the engine intake manifold from the engine cylinders as the engine rotates in the reverse direction.

Method 400 may also determine the stabilized engine MAP value after the engine throttle is closed. The stabilized engine MAP value may also be indicative of the wastegate position since the wastegate position may restrict or allow air to flow around the turbocharger compressor. Method 400 proceeds to 420.

At 420, method 400 judges if the manifold pressure time constant determined at 418 is greater than (G.T.) a threshold time, or alternatively, if the stabilize engine MAP pressure in the engine intake manifold is less than a threshold pressure. The threshold time and the threshold pressure may be empirically determined by rotating the engine in a reverse direction with the wastegate and engine throttle open, then closing the engine throttle and observing the progression of engine MAP. If method 400 judges that the intake manifold pressure time constant is greater than the threshold time or if the stabilized engine MAP pressure is less than the threshold pressure, the wastegate may be in a closed position when it is commanded to an open position. The intake manifold pressure time constant may increase due to lower flow of air through the engine because of the closed wastegate. Likewise, the stabilized engine MAP value after closing the engine intake throttle may be lower since the amount of air flow into the intake manifold may be closer to the amount of air flowing out of the intake manifold. If method 400 judges that the intake manifold pressure time constant is greater than the threshold time, or alternatively, if the stabilized engine MAP pressure is less than the threshold pressure, method 400 proceeds to 460. Otherwise, method 400 proceeds to 422.

At 460, method 400 indicates wastegate degradation in the closed state. Method 400 may indicate wastegate degradation via displaying a message on as human/machine interface or via illuminating a light. Method 400 may also limit engine speed via limiting the throttle opening amount and/or limiting an amount of fuel that may be injected to the engine. Further, spark timing may be retarded from minimum spark timing for best torque (MBT) in response to the wastegate being degraded in a closed state. In these ways, higher boost pressures and engine intake pressures may be avoided. Method 400 proceeds to 462.

At 462, method 400 ceases rotating the engine in the reverse direction. Further, method 400 ceases sampling the MAP sensor and storing engine MAP values to memory. Method 400 may command the ISG or engine starter off. Method 400 proceeds to exit.

At 422, method 400 fully opens the engine intake throttle (e.g., 62 of FIG. 1). The engine throttle is opened to reduce air flow restriction through the engine. Method 400 proceeds to 424.

At 424, method 400 commands the wastegate to a closed position. Controller 12 may command the wastegate to the closed position via an electrical signal. The electrical signal may directly close the wastegate or it may close a valve to allow a spring to return the wastegate to a closed position. Method 400 proceeds to 426.

At 426, method 400 closes the engine intake throttle (e.g., 62 of FIG. 1) in a step wise manner. The throttle is closed so that air flow out of the engine intake manifold to atmosphere via the engine intake may be limited or reduced. By closing the throttle, pressure in the intake manifold may increase due to air flowing out of engine cylinders and into the engine intake manifold as the engine rotates in the reverse direction. Method also continues storing engine MAP values to controller memory, which began at 414. Method 400 proceeds to 428.

At 428, method 400 determines a time constant for a pressure change in the engine intake manifold. Specifically, method 400 determines a time constant for increasing pressure in the engine intake manifold from an initial pressure when the throttle was open with the engine rotating in the reverse direction to a final pressure in the engine intake manifold when the throttle is closed with the engine rotating in the reverse direction. The time constant may be determined after the engine intake throttle has been closed for a predetermined amount of time that allows the engine intake manifold pressure to stabilize at a substantially constant value (e.g., ±5% of reading). In one example, the predetermined amount of time may be determined via monitoring engine intake manifold pressure while the engine is rotated in the reverse direction with the wastegate open and the throttle open, then closing the throttle. The engine rotates at a constant speed throughout the diagnostic.

The time constant is determined via processing the engine MAP data beginning just before the engine throttle is closed until engine MAP reaches a stabilized substantially constant value. The time constant for the manifold pressure change is the amount of time from when the throttle is commanded closed until the engine MAP value reaches 63.2% of the stabilized substantially constant value after the throttle was closed. The value of the time constant may also be indicative of the wastegate position since the wastegate position may restrict or allow air to flow around the turbocharger compressor, thereby regulating air flow into the engine intake manifold from the engine cylinders as the engine rotates in the reverse direction.

Method 400 may also determine the stabilized engine MAP value after the engine throttle is closed. The stabilized engine MAP value may also be indicative of the wastegate position since the wastegate position may restrict or allow air to flow around the turbocharger compressor. Method 400 proceeds to 430.

At 430, method 400 judges if the manifold pressure time constant determined at 428 is less than a threshold time, or alternatively, if the stabilize engine MAP pressure in the engine intake manifold is greater than a threshold pressure. The threshold time and the threshold pressure may be empirically determined by rotating the engine in a reverse direction with the wastegate closed and engine throttle open, then closing the engine throttle and observing the progression of engine MAP. If method 400 judges that the intake manifold pressure time constant is less than the threshold time or if the stabilized engine MAP pressure is greater than the threshold pressure, the wastegate may be in an open position when it is commanded to a closed position. The intake manifold pressure time constant may decrease due to higher flow of air through the engine because of the open wastegate. Likewise, the stabilized engine MAP value after closing the engine intake throttle may be higher since the amount of air flow into the intake manifold may be larger than the amount of air flowing out of the intake manifold until flow through the throttle stabilizes. If method 400 judges that the intake manifold pressure time constant is less than the threshold time, or alternatively, if the stabilized engine MAP pressure is greater than the threshold pressure, the answer is yes and method 400 proceeds to 440. Otherwise, the answer is no and method 400 proceeds to 432.

At 440, method 400 indicates wastegate degradation in the open state. Method 400 may indicate wastegate degradation via displaying a message on as human/machine interface or via illuminating a light. Method 400 may also adjust engine actuators to improve engine emissions while the wastegate is open. Further, spark timing may be advanced toward minimum spark timing for best torque (MBT) in response to the wastegate being degraded in a closed state. In these ways, lower boost pressures and engine emissions may be compensated. Method 400 proceeds to 434.

At 434, method 400 ceases engine rotation vis commanding the ISG or starter off. Further, method 400 ceases sampling engine MAP and storing engine MAP values to controller memory. Method 400 proceeds to exit.

In this way, the presence or absence of wastegate degradation may be determined. If wastegate degradation is determined, then operation of the engine may be adjusted via an engine actuator to compensate for wastegate degradation.

Thus, the method of FIGS. 4 and 5 provides for an engine operating method, comprising: receiving sensor data to a controller and generating a wastegate diagnostic request via the controller; providing an indication of wastegate degradation based on intake manifold pressure, the intake manifold pressure sensed while rotating an engine in a reverse direction and not combusting air and fuel in the engine in response to the wastegate diagnostic request; and adjusting an actuator in response to the indication. The method includes where the actuator is a fuel injector, intake throttle, or ignition system, and further comprising: rotating the engine in a forward direction while combusting air and fuel in the engine. The method includes where the engine is rotated in the reverse direction via a starter motor or an integrated starter/generator. The method further comprises adjusting a position of an intake throttle in response to the wastegate diagnostic request. The method includes where adjusting the position of the intake throttle includes opening the throttle from a closed position and closing the throttle after opening the throttle. The method further comprises recording output of an intake manifold pressure sensor to memory from a time before closing the throttle to a predetermined time after closing the throttle. The method further comprises determining a time constant for intake manifold pressure to change from a first pressure to a second pressure, the first pressure a pressure in the intake manifold immediately before closing the throttle, the second pressure a pressure in the intake manifold a predetermined amount of time after closing the throttle. The method includes where a wastegate is open while closing the throttle.

The method of FIGS. 4 and 5 also provides for an engine operating method, comprising: receiving sensor data to a controller and generating a wastegate diagnostic request via the controller; rotating an engine in a reverse direction with an open intake throttle while not combusting air and fuel in the engine in response to a wastegate diagnostic request; providing an indication of wastegate degradation based on intake manifold pressure after closing the intake throttle a first time since the wastegate diagnostic request; and adjusting an actuator in response to the indication. The method includes where providing the indication of wastegate degradation based on intake manifold pressure after closing the intake throttle includes determining a time constant for intake manifold pressure rise, and where the indication of wastegate degradation is based on a value of the time constant. The method includes where providing the indication of wastegate degradation based on intake manifold pressure after closing the intake throttle the first time since the wastegate diagnostic request includes determining an intake manifold pressure after closing the intake throttle the first time since the wastegate diagnostic request, and where the indication of wastegate degradation is based on a value of the intake manifold pressure.

In some examples, the method further comprises opening the intake throttle after closing the intake throttle the first time since the wastegate diagnostic request, and then closing the intake throttle a second time. The method includes where a wastegate is open when the intake throttle is closed a first time since the wastegate diagnostic request. The method includes where the wastegate is closed when the intake throttle is closed the second time. The method includes where the engine is rotated in the reverse direction via an integrated starter/generator.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
generating, via a controller, a wastegate diagnostic request;
providing, via the controller, an indication of wastegate degradation based on intake manifold pressure, the intake manifold pressure sensed while rotating an engine in a reverse direction and not combusting air and fuel in the engine in response to the wastegate diagnostic request; and
adjusting, via the controller, an actuator in response to the indication.

2. The method of claim 1, where the actuator is a fuel injector, intake throttle, or ignition system, and further comprising:
rotating the engine in a forward direction while combusting air and fuel in the engine.

3. The method of claim 1, where the engine is rotated in the reverse direction via an electric machine.

4. The method of claim 1, further comprising adjusting a position of an intake throttle in response to the wastegate diagnostic request.

5. The method of claim 4, where adjusting the position of the intake throttle includes opening the throttle from a closed position and closing the throttle after opening the throttle.

6. The method of claim 5, further comprising recording output of an intake manifold pressure sensor to memory from a time before closing the throttle to a predetermined time after closing the throttle.

7. The method of claim 6, further comprising determining a time constant for intake manifold pressure to change from a first pressure to a second pressure, the first pressure being a pressure in the intake manifold immediately before closing the throttle, the second pressure being a pressure in the intake manifold the predetermined amount of time after closing the throttle.

8. The method of claim 7, where a wastegate is open while closing the throttle.

9. An engine operating method, comprising:
generating, via a controller, a wastegate diagnostic request;
rotating an engine in a reverse direction with an open intake throttle while not combusting air and fuel in the engine in response to the wastegate diagnostic request;
providing, via the controller, an indication of wastegate degradation based on intake manifold pressure after closing the intake throttle a first time since the wastegate diagnostic request; and
adjusting, via the controller, an actuator in response to the indication.

10. The method of claim 9, where providing the indication of wastegate degradation based on intake manifold pressure after closing the intake throttle includes determining a time constant for intake manifold pressure rise, and where the indication of wastegate degradation is based on a value of the time constant.

11. The method of claim 9, where providing the indication of wastegate degradation based on intake manifold pressure after closing the intake throttle the first time since the wastegate diagnostic request includes determining an intake manifold pressure after closing the intake throttle the first time since the wastegate diagnostic request, and where the indication of wastegate degradation is based on a value of the intake manifold pressure.

12. The method of claim 9, further comprising opening the intake throttle after closing the intake throttle the first time since the wastegate diagnostic request, and then closing the intake throttle a second time.

13. The method of claim 12, where a wastegate is open when the intake throttle is closed the first time since the wastegate diagnostic request.

14. The method of claim 13, where the wastegate is closed when the intake throttle is closed the second time.

15. The method of claim 9, where the engine is rotated in the reverse direction via an integrated starter/generator.

16. An engine system, comprising:
an engine;
an electric machine; and
a controller including executable instructions stored in non-transitory memory for generating a wastegate diagnostic request and carrying out a wastegate diagnostic routine, the memory further including instructions that cause the controller to rotate the engine clockwise and counter clockwise, the engine rotated clockwise when the engine combusts air and fuel, the engine rotating counter clockwise when the engine is not combusting air and fuel and in response to the request for a wastegate diagnostic and while the wastegate diagnostic routine is performed.

17. The engine system of claim 16, further comprising additional instructions to determine a time constant for intake manifold pressure to increase.

18. The engine system of claim 16, further comprising additional instructions to adjust an engine actuator in response to an indication of wastegate degradation.

19. The engine system of claim 16, further comprising additional instructions to record intake manifold pressure to controller memory while rotating the engine counter clockwise.

20. The engine system of claim 19, further comprising additional instructions to rotate the engine counter clockwise when no occupants are within a vehicle.

* * * * *